United States Patent
Iwamoto

(10) Patent No.: US 6,316,042 B1
(45) Date of Patent: Nov. 13, 2001

(54) COOKED RICE FOR LOW TEMPERATURE DISTRIBUTION

(75) Inventor: Tadahiro Iwamoto, 2912 Pine Ave., Manhattan Beach, CA (US) 90267

(73) Assignees: Tadahiro Iwamoto; Yukiki Iwamoto, both of Manhattan Beach, CA (US); a part interest ( * ) Notice: Subject to any disclaimer, the term of this patent is extended or adjusted under 35 U.S.C. 154(b) by 0 days.

(21) Appl. No.: 09/461,772

(22) Filed: Dec. 15, 1999

(51) Int. Cl.⁷ ........................................................ A23L 1/168
(52) U.S. Cl. .......................... 426/618; 426/573; 426/634; 426/639
(58) Field of Search ................................... 426/618, 639, 426/573, 634

(56) References Cited

U.S. PATENT DOCUMENTS 5,098,726 * 3/1992 Goddard ............................. 426/618
6,045,847 * 4/2000 Nakamura et al. .................. 426/618

FOREIGN PATENT DOCUMENTS

| 8168350 | 7/1996 | (JP) . |
| 408294365A | * 11/1996 | (JP) . |
| 09107899 | 4/1997 | (JP) . |
| 9163943 | 6/1997 | (JP) . |
| 9322725 | 12/1997 | (JP) . |
| 10150938 | 6/1998 | (JP) . |
| 11285350 | 10/1999 | (JP) . |
| 2000526766 | 6/2000 | (JP) . |

* cited by examiner

*Primary Examiner*—Helen Pratt
(74) *Attorney, Agent, or Firm*—Birch, Stewart, Kolasch & Birch, LLP

(57) ABSTRACT

The invention relates to boiled rice foods containing soybean polysaccharides and trehalose. The texture of the boiled rice foods does not deteriorate when returned to an edible state by de-chilling or thawing following distribution in a chilled or frozen state, and are free from hygiene problems associated with de-chilling or thawing at room temperature.

1 Claim, No Drawings

COOKED RICE FOR LOW TEMPERATURE DISTRIBUTION

BACKGROUND OF THE INVENTION

The present invention relates to boiled rice foods capable of being distributed at low temperatures. Specifically, the present invention relates to boiled rice foods having a texture which does not deteriorate following distribution and storage at low temperatures, and which are free from hygienic problems associated with warming or thawing at room temperature.

More specifically, the present invention relates to boiled rice foods having a texture which does not deteriorate when warmed or thawed following chilled or frozen distribution, and which are free from any hygienic problems associated with warming or thawing at room temperature. In the present invention, "chilled distribution" refers to distribution and storage in a temperature below about 5° C. and above a freezing point; "frozen distribution" refers to distribution and storage in a temperature range which enables freezing; while "de-chilling" refers to warming in a temperature below about 10° C. and above a freezing point.

Cooked boiled rice hardens over time. This phenomenon is also called deterioration of boiled rice. The degree of deterioration increases at lower temperatures. Such deterioration results from changes in intrinsic starch and it has been suggested that the mechanism involves recrystallization of starch which has been gelatinized and swollen under the influence of water and heat. In particular, the taste, texture and flavor of boiled rice all significantly deteriorate after distribution and storage at a temperatures sufficiently low to cause chilling or freezing.

In order to prevent the deterioration of boiled rice, attempts have been made which utilize methods such as increasing the amount of water added for cooking or adding enzymes such as α-amylase, β-amylase, glucoamylase and protease, starch such as pregelatinized starch and chemically modified starch, polysaccharides such as Duran gum and hyaluronic acid, sugars such as anhydrosugar, dextrin, glucose, fructose and cyclodextrin, sugar alcohols such as trehalose, maltitol, sorbitol and lactitol, or fatty acid esters such as sucrose fatty acid ester, polyglycerin fatty acid ester and glycerin fatty acid ester, and emulsifiers such as organic acid esters of monoglycerides. However, none of these methods achieve any significant improvement in taste or texture.

When boiled rice foods containing these additives are chilled or frozen for distribution, various methods are available to effect de-chilling or thawing, such as allowing the food to stand at room temperature for a period of time, warming at a relatively low temperature (de-chilling), or thawing by heating in a microwave oven. However, if foods are left to stand at room temperature for a period of time, a hygienic problem can arise. In addition, thawing by heating is not suitable for boiled rice foods such as sushi. If the microwave method is used for more suitable foods, hardening is likely to result, causing an undesirable taste, texture and flavor. The same problem exists with respect to de-chilling. When boiled rice foods produced in a conventional method are subjected to de-chilling, such foods will suffer a deterioration in taste and texture.

As a countermeasure against such deterioration, a method of adding trehalose or trehalose plus sugar alcohol (e.g. JP-A 8-168350 and JP-A 9-163943) has been proposed. This method is said to enable foods to be returned to an edible state without heating following chilled or frozen storage and distribution. However, no improvement in taste and texture can be achieved using de-chilling, thus such foods should be thawed at room temperature. Thus, the problem of hygiene is not solved thereby. Further, thawing at room temperature does not effect a satisfactory improvement in taste and texture.

The object of the present invention is to provide boiled rice foods the taste, texture and flavor of which do not deteriorate when returned to an edible state by hygienic de-chilling after being distributed in a chilled or frozen state.

SUMMARY OF THE INVENTION

As a result of intensive study to solve the object described above, the present inventor has found that by adding soybean polysaccharides and trehalose during cooking, deterioration in the quality of boiled rice foods with respect to taste, texture and flavor, caused by chilled distribution or frozen distribution, can be prevented to a far greater extent than that achieved by the conventional method. It has also been found that, as a method of returning boiled rice foods to an edible state, this technique can be applied to de-chilling or thawing at relatively low temperatures thus avoiding hygiene problems which arise at room temperature.

The present invention provides boiled rice foods containing soybean polysaccharides and trehalose. The boiled rice foods of the present invention can be obtained by cooking rice with addition of soybean polysaccharides and trehalose. The boiled rice foods of the present invention containing soybean polysaccharides and trehalose are advantageous in that deterioration in the quality of the rice foods with respect to taste and texture can be prevented when they are de-chilled following chilled or frozen distribution. Further, hygienic problem caused by thawing at room temperature can be avoided. Thus, the boiled rice foods of the invention are much more suitable for low-temperature storage and distribution than the conventional products.

DETAILED DESCRIPTION OF THE INVENTION

As used herein, the term "soybean polysaccharides" refers to water-soluble polysaccharides, such as hemicellulose. Preferably, SOYAFIBE-S™ (Fuji Oil Co., Ltd.) may be used as a soybean polysaccharide. The soybean polysaccharides are added in an amount of 0.1 to 4% by weight, and trehalose is added in an amount of 0.1 to 4% by weight, preferably 0.5 to 3% by weight, more preferably 1 to 2.5% by weight, relative to the amount of raw rice. Soybean polysaccharides are believed to contribute to an increase of water absorbed in boiled rice, and trehalose is believed to have the effect of fixing water absorbed in boiled rice. It is currently believed that, by addition of these compounds, the amount of water absorbed in boiled rice is significantly increased and fixed therein, whereby a sufficient amount of absorbed water remains in boiled rice even upon de-chilling or thawing following chilled or frozen distribution, thus deterioration In taste, texture, flavor can be prevented.

In a preferred embodiment of the present invention, the improvement in taste, texture and flavor becomes even more pronounced when a food-grade enzyme is added. Selection of a suitable food-grade enzyme is not particularly limited so far as it can be used in boiled rice foods, and examples include α-amylase, β-amylase, glucoamylase, pectinase, protease or papain. A wide variety of food-grade enzyme preparations containing a mixture of enzymes such as amylase, protease and papain are commercially available. For example, an enzyme preparation Miora™ (Otsuka Pharmaceutical Co., Ltd.) is suitable for use. These food-grade enzymes are added in an amount of 0.0001 to 1% by weight, preferably 0.0002 to 0.5% by weight, more preferably 0.0005 to 0.1% by weight relative to the amount of raw rice. It is believed that these food-grade enzymes facilitate the hydrolysis of cell walls, cell membranes and amyloplast membranes of rice albumen or starch particle-binding protein to promote gelatinization and swelling of starch particles, thus contributing to an increase in the amount of water incorporated into the cooked rice.

In accordance with the invention, the boiled rice foods containing soybean polysaccharides and trehalose exhibit a reduced deterioration in their texture. In addition, the amount of water incorporated is increased by adding a food-grade enzyme to improve water retention efficacy, thereby further improving taste, texture and flavor.

In another preferred embodiment, the boiled rice foods of the present invention may further contain edible acetic acid and edible fats and oils. Edible acetic acid is not particularly limited, and conventional vinegar is preferably used. Edible acetic acid may be added in an amount of 0.1 to 5% by weight, preferably 0.5 to 4% by weight, more preferably 1 to 3% by weight relative to raw rice. Edible fats and oils are not particularly limited, and conventionally used vegetable oils can be preferably used. Edible fats and oils may be added in an amount of 0.1 to 5% by weight, preferably 0.5 to 4% by weight, more preferably 1 to 3% by weight relative to the amount of raw rice. Edible acetic acid is believed to act to soften cell walls of boiled rice, while edible fats and oils affect the shape retention of boiled rice grains. Accordingly, it is believed that addition of these ingredients helps providing a texture similar to that of fresh boiled rice.

The raw rice material used in the boiled rice foods of the present invention is not particularly limited, and any rice distributed on the market can be used. Preferably, rice with a low amylose content, specifically with an amylose content of 15% or less, preferably 10% or less can be used to provide boiled rice foods having a good taste and texture. The term "amylose content" herein used refers to an apparent amylose content determined by iodine affinity measurement or by iodine colorimetry, and is not necessarily coincident with true amylose content. This content is expressed on a dry weight basis.

For production of boiled rice foods of the present invention, the procedure of cooking itself is not particularly limited, and a usual method of producing cooked rice can be used. The method of adding soybean polysaccharides and trehalose is not particularly limited, and these ingredients may be added water followed by immersion and cooking of rise; or if water is changed between the steps of immersion and cooking, these ingredients may be added to water for cooking only. Alternatively, these ingredients may be added during or after the step of cooking. Similarly, the method of adding food-grade enzymes, edible acetic acid and edible fats and oils is not particularly limited. Water used for immersion and cooking is not particularly limited, and for example, degassed water, electrical-field water or magnetic-field water can all be used, among which degassed water is particularly preferable. Degassed water is water prepared by removing a dissolved gas by passing water along one side of a gas-permeable and liquid-impermeable membrane while maintaining the other side in vacuo; electrical-field water is water to which a high-pressure static voltage is applied; and magnetic-field water is water which has been passed through a magnetic field and an electrical field.

The amount of water used in cooking is preferably greater than that used in producing usual cooked rice. The amount of water relative to the amount of raw rice will vary depending on the boiled rice food, but may be in the range from 190 to 230% by weight, preferably 200 to 210% by weight for sushi rice, or from 160 to 190% by weight, preferably 170 to 185% by weight for non-sushi rice.

Preferable examples of boiled rice foods of the present invention include sushi distributed in a frozen state. In general, sushi materials, in particular fish and shellfish are easily heat-denatured upon heating and thawing. In contrast, frozen sushi prepared according to the present invention can be thawing at relatively low temperature so that sushi materials such as fish and shellfish are not denatured. Moreover, the problems of hygiene accompanying room-temperature thawing do not arise, and the same texture as exists just after production can be obtained at the time of eating. Frozen rice balls, pilafs, and boiled rice with assorted mixtures are also preferable examples. Such foods can be eaten after being subjected to thawing at relatively low temperatures, and as required, heated in a microwave oven.

EXAMPLES

The present invention is described in more detail by reference to the Examples below. Such examples, however, are not intended to limit the scope of the present invention.

Example 1

400 g California rice was washed with water, and the water was drained off, then the rice was immersed in 830 cc degassed water (at a volume 2.08-times greater than that of the rice). 8 g (2 weight-%) Soyafibe-S™ (Fuji Oil Co., Ltd.) as soybean polysaccharides, 8 g (2 weight-%) trehalose, 1 g (0.2 weight-%) Miora™ (Otsuka Pharmaceutical Co., Ltd.) as a food-grade enzyme preparation, 8 cc (2 weight-%) vinegar, and 2 cc (0.5 weight-%) salad oil were added to the immersion water, and the rice was cooked in a household rice cooker. 105 cc (26 weight-%) sushi vinegar was added to the rice thus cooked. Thereafter, the rice was cooled at 35° C. in a cooling unit and formed into a shape usable for sushi. The sushi rice thus formed was frozen and stored at −20° C. After storage for 24 hours, it was subjected to thawing at 4° C. for 24 hours and its qualities evaluated. The sushi rice had a taste and texture the same as that following production.

Example 2

400 g California rice was washed with water, and the water was drained off, then the rice was immersed in 720 cc degassed water (at a volume 1.8-times greater than that of the rice). 6 g (1.5 weight-%) Soyafibe-S™ (Fuji Oil Co., Ltd.) as soybean polysaccharides, 8 g (2 weight-%) trehalose, 1 g (0.2 weight-%) Miora™ (Otsuka Pharmaceutical Co., Ltd.) as a food-grade enzyme preparation, 8 cc (2 weight-%) vinegar, and 2 cc (0.5 weight-%) salad oil were added to the immersion water, and the rice was immersed therein for 1 hour and then cooked in a household rice cooker. The rice thus cooked was cooled at 35° C. in a vacuum cooling unit and formed into a rice ball. The rice ball was stored at 4° C. After storage in this state for 48 hours, its qualities were evaluated. The rice ball had a taste and texture the same as that after production.

Comparative Example

Sushi boiled rice was produced, frozen and subjected to thawing in the same manner as in Example 1, except that the soybean polysaccharides were not added. The resulting sushi rice was rigid and brittle and failed to retain its form, and was unpalatable.

What is claimed is:

1. Boiled rice foods consisting essentially of soybean polysaccharides and trehalose, wherein the soybean polysaccharides and trehalose are present in amounts of 0.1 to 4% by weight and 0.1 to 4% by weight, respectively, relative to the amount of raw rice.

* * * * *